Feb. 6, 1968 N. R. DIBELIUS 3,367,329

SURGICAL BANDAGE AND METHOD OF FABRICATION

Filed Aug. 27, 1965

Inventor:
Norman R. Dibelius,
by Paul A. Frank
His Attorney.

United States Patent Office 3,367,329
Patented Feb. 6, 1968

3,367,329
SURGICAL BANDAGE AND METHOD OF FABRICATION
Norman R. Dibelius, Ballston Spa, N.Y., assignor to General Electric Company, a corporation of New York
Filed Aug. 27, 1965, Ser. No. 483,072
7 Claims. (Cl. 128—156)

ABSTRACT OF THE DISCLOSURE

An improvement in surgical bandages is described wherein a thin non-porous membrane impervious to liquids and infectious organisms and permeable to oxygen gas, nitrogen gas and water vapor is employed. The membrane has bonded thereto at least one sheet of stretchable porous material to support the membrane and to conform the membrane to body surfaces, when the bandage is applied over a wound forming a completely enclosed region upon adherence of the bandage to the skin. A method for the preparation of the improved bandage is also described.

My invention relates to a new type of surgical bandage and the method of fabrication thereof, and in particular, to a bandage having a selectively permeable membrane for permitting controlled passage of gases and water vapor from the wound being treated and for passage of specific gases to the wound area.

Known surgical bandages, wherein such bandages range in size from the small type covering shallow surface wounds, burns, and the like, commonly known as the Band-Aid, a Johnson and Johnson trademark, to the large surgical dressing type, are fabricated from a gauze material which permits some passage therethrough of gas, vapor and liquids, the degree of passage being determined by the type of gauze material and layers thereof employed. These known bandages are not completely exclusive of infectious organisms and occasionally employ germicides to reduce chance of infection. Prior to my invention no bandage was known to be impermeable to the passage of liquids, selectively permeable to specific gases and vapors and capable of conforming to the body shape of the wound area. Such a selectively permeable bandage assures that no undesirable solid matter or infectious organisms such as bacteria, virus and germs can pass from the atmosphere into the wound area and simultaneously insures that the loss of body fluid (as water vapor) is sufficient but not excessive, and prevents the loss of body salts.

Therefore, one of the principal objects of my invention is to provide a new surgical bandage which is selectively permeable to specific gases and vapors and the method of fabrication thereof.

Another object of my invention is to provide such bandage which is capable of conforming to the body shape around the wound area, prevents infection by excluding infectious organisms such as bacteria and virus from the wound, and permits the passage of oxygen to the wound area to aid in the healing process.

In accordance with my invention and the objects enumerated above, I provide a surgical bandage which includes an imperforate membrane impermeable to liquids and solids but selectively permeable to specific gases and vapors and a backing comprising stretchable porous material attached to one side of the membrane for permitting conformance of the surgical bandage to body contours and also increasing the mechanical strength of the membrane and protecting the membrane from abrasion. An adhesive material is applied, preferably along all edges of one side of the bandage for sealing such edges to the body skin surrounding the wound to assure that the passage of specific gases and water vapor is confined to the material of the bandage rather than passing around such material along an unsealed edge thereof. My surgical bandage is fabricated by priming the stretchable porous backing material with a suitable fluid such as a silicone rubber solution dissolved in isopropyl alcohol, then pressing the stretchable backing and a sheet of the membrane together and finally subjecting the backed membrane to a curing step for obtaining a permanent bond between the membrane and backing. A suitable adhesive is then applied at one side of the backed membrane along the portions thereof which will form the edges of the individual bandages. The individual bandages may be precut to size from the sheet of backed membrane and the adhesive applied along the edges of the individual bandages, or alternatively, the adhesive may be applied on the predetermined sections of the sheet which determine the edges of each individual bandage upon subsequent cutting of the sheet.

The features of my invention which I desire to protect herein are pointed out with particularity in the appended claims. The invention itself, however, both as to its organization and method of operation together with further objects and advantages thereof, may best be understood by reference to the following description taken in connection with the accompanying drawing wherein:

Figure 1:
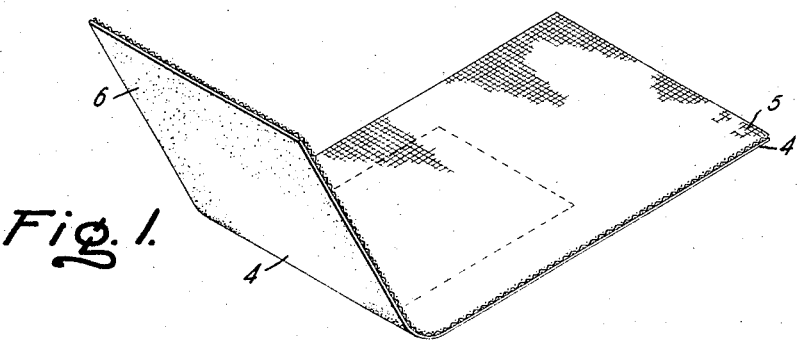
FIGURE 1 is a perspective view of a rectangular shaped surgical bandage fabricated in accordance with my invention.

In FIGURE 1 there is shown a first embodiment of my invention wherein a rectangular shaped surgical bandage is fabricated from a suitable imperforate membrane 4, which is selectively permeable to specific gases and water vapor, and a suitable stretchable porous material 5 bonded thereto. An adhesive 6 is disposed along the edges of one side of the bandage for providing a seal between the bandage and the body skin surrounding a wound, burn, or the like. Membrane 4 is constructed of a material, such as the silicone rubber membranes described in U.S. patent applications S.N. 241,346, filed Nov. 30, 1962; 247,904 filed Dec. 28, 1962; 269,430 filed Apr. 1, 1963; 397,687 filed Sept. 21, 1964; and 466,698 filed June 24, 1965 all by the inventor Walter L. Robb and assigned to the assignee of the present invention. The selectively (or semi-) permeable membrane 4 is nonperforate and defect-free and has a uniform thickness in the range of 1 to 10 mils. Membrane 4 is selectively permeable to specific gases and vapors, such as oxygen, nitrogen and water vapor, but prevents passage of liquids and solid matter or infectious organisms such as bacteria or virus to the wound area which interfere with the healing process or cause infection. Thus, air and body water (in the gaseous or vapor state) flow through the membrane in opposite directions but body salts are retained to hasten the healing of the wound. The transfer of gases and/or vapors through the (permselective) membrane 4 is based on a partial pressure differential across the membrane wherein the gas or vapor that is to be transferred is at a greater partial pressure on one side of the permselective membrane than on the other side. The transfer process itself is one of permeation through the membrane due to the partial pressure differential and is not related to the conventional filtering process which is based on certain size molecules passing through related size holes in a membrane. The permeation proceeds from the area of higher partial pressure to the area of lower partial pressure as described in the above-cited patent applications to Robb.

Membrane 4, alone, possesses some favorable characteristics for a surgical bandage, but has the disadvantage that such bandage does not conform to irregular body shapes. Thus, an unbacked membrane bandage is subject to abrasion and is very likely to rupture if applied to a wound on the elbow or a like body portion having a nonplanar surface.

Figure 3:
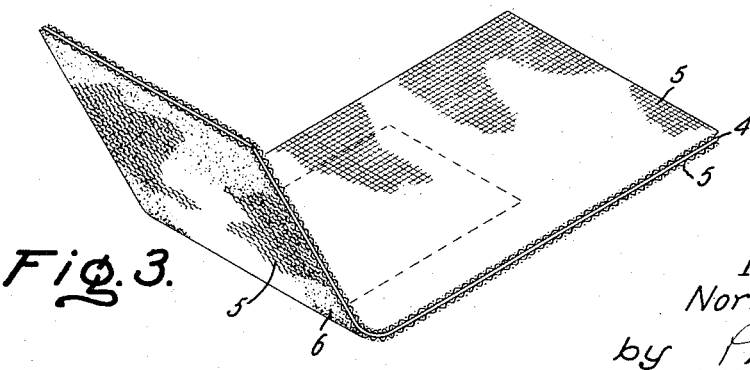
FIGURE 3 is a perspective view of a second embodiment of the rectangular bandage.

Permselective membrane 4 is suitably attached, as by bonding, to a backing material 5 which is characterized as a two-way stretchable, nontoxic, porous material such as nylon, dacron, polyethylene, cotton and linen. The backing material permits the membrane to conform to the various body curves to thereby prevent rupture, abrasion, or other damage to the membrane, and also increases the mechanical strength thereof since it adds reinforcement to the relatively weak membrane without impairing its operation. The backing is secured to the membrane in a manner to be described hereinafter, on one side thereof, as illustrated in FIGURE 1, or it may be disposed on both sides thereof to form a sandwich arrangement as illustrated in FIGURE 3, to provide even greater mechanical strength to the bandage. The backing material 5 is nontoxic, that is, should not be of a material or contain dyes which are harmful to a wound or the body skin in the case wherein the backing layer is on only one side of the membrane as employed in FIGURE 1. In the case wherein the backing 5 is secured to both sides of the membrane, 4, as in FIGURE 3, the backing must, of necessity, be a nontoxic material since such backing is then in contact with the wound area. The backing material need not have a thickness of any particular dimensions, the only requirements being that the thickness be sufficiently large to provide the desired mechanical strength for the bandage and yet permit the two-way stretching of the bandage so that it conforms to the shape of the body in the area of the wound and also not impede any fluid(s) which permeate the membrane. Thus, the thickness of the backing material may be as small as several mils or may be great as 30 mils or more, the range of thickness being determined primarily by the particular backing material employed. As an example, a backing material made of nylon or dacron fabric has been used with a thickness of 5 mils.

A suitable adhesive material 6 is disposed along the edges of one side of the bandage in a closed circuit to permit sealing of these edges to the healthy body skin surrounding the wound to insure that the only passage of gas or vapor to and from the wound area is through the membrane 4. The adhesive material may be any of the common types used with medical adhesive tapes. In the case of a single-side backed membrane bandage, the adhesive material 6 is preferably applied to the membrane since the membrane is less liable to stick to the wound than the backing. However, this is not a limitation and the bandage may also be suitable for its intended use on application of the adhesive to the backing under certain circumstances. The bandages when packaged or stored within a container have a suitable paper or other fibrous material as a peelable backing (not shown) on the side of the bandage containing the adhesive material to prevent the adhesion of adjacent bandages in the package and also to maintain sterility of the area of the bandage which will be in closest contact to the wound. The bandages may range in size from a fraction of a square inch to several square feet in the latter case the bandage being supplied in rolls or large sheets.

Figure 2:
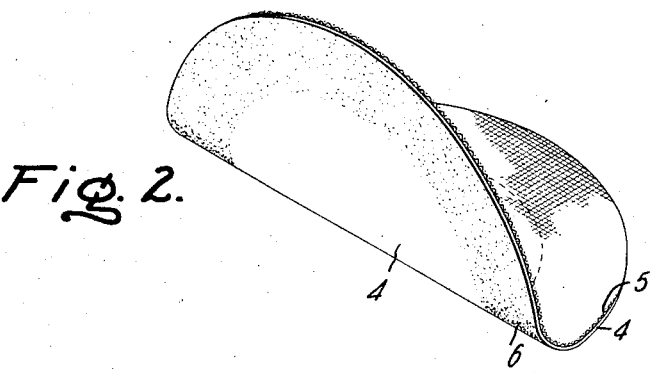
FIGURE 2 is a perspective view of a circular surgical bandage.

In FIGURE 2, there is shown a second embodiment of the surgical bandage fabricated in accordance with my invention wherein the bandage is of circular shape. The bandage of FIGURE 2 is constructed of the same materials as the bandage of FIGURE 1 and finds application where the body curves are such that a circular shaped bandage is more convenient, or provides greater assurance of maintaining a seal with subsequent body movement than does the rectangular shaped bandage. Thus, the circular shaped bandage of FIGURE 2 includes a permselective membrane 4, a layer of backing 5 bonded thereto, and an adhesive 6 along the edges of the bandage. The circular bandage may also comprise backing materials on both sides of membrane 4, if desired.

The bandages hereinabove described are fabricated in the following method. A flat sheet of the stretchable backing material 5 is primed with a suitable fluid such as a silicone rubber solution dissolved in isopropyl alcohol and such primed sheet of backing is then pressed together with a flat sheet of the selectively permeable membrane 4. The isopropyl alcohol evaporates off and the silicone rubber solution remains as the bonding agent for securing the backing to the membrane. The pressing step involves only a slight pressure generally up to one atmosphere to prevent damage to the relatively weak membrane. A final curing step is then employed to assure a permanent bond of the backing to the membrane. This final curing step includes the application of heat, approximately 150° C. for one-half hour. The heat curing step may also be conducted at a lower temperature which is maintained for a longer length of time. Curing may also be achieved by employing radiation such as an electron beam or ultraviolet in the place of the heat, the energy of such radiation resulting in polymerization of the silicone rubber solution. The individual bandages are obtained in one of two manners, the sheet of backed membrane may be precut to the size of the individual bandages and the adhesive 6 then applied along the edges of the individual bandages, or alternatively, the adhesive may be applied on predetermined sections of the sheet wherein such predetermined sections determine the edges of individual bandages and the sheet then subsequently cut to form such individual bandages. A suitable paper or other fiberous material can then be applied to the adhesive side of the bandage to provide the peelable protective backing heretofore described.

From the foregoing description, it is apparent that my invention attains the objectives set forth in that it provides a new surgical bandage which is selectively permeable to specific gases and water vapor and also capable of conformance to the body shape around the wound area. My invention also provides a method of fabrication of such new bandage. The bandage has the advantages that it permits control of the loss of fluids which are discharged by the wound and at the same time prevents body tissue in the wound area from being deprived of oxygen since it permits passage of such gases as oxygen and air through the bandage to the wound area to further hasten or promote the healing process while excluding undesirable solid matter or infectious organisms such as bacteria or virus which might cause infection in the wound area and subsequent complications.

Having described a new surgical bandage and method of fabrication thereof, it is believed obvious that modification and variation of my invention is possible in the light of the above teachings. Thus, the bandages may be of shapes other than the illustrated rectangular and circular and other equivalent backing materials and adhesives may be employed with the selectively permeable membrane. It is, therefore, to be understood that changes may be made in the particular embodiment of my invention described which are within the full intended scope of the invention as defined by the following claims.

What I claim as new and desire to secure by Letters Patent of the United States is:

1. In a surgical bandage for covering a wound area, the bandage being intended to be adhered to skin surface outside the wound area by an adhesive layer covering a portion of the bandage, the balance of the bandage being unadhered to the skin surface and consisting of a dressing material permitting gas and vapor transmission to and from the wound area, the improvement wherein the dressing material comprises:
- (a) a thin non-porous membrane impervious to liquids and infectious organisms and permeable to oxygen gas, nitrogen gas and water vapor, said membrane extending continuously over an area of the bandage defined by the adhesive layer,
  - (1) said adhesive layer being applied to the edges of said bandage in a closed circuit in order to provide a completely enclosed region upon adherence of the circuit of adhesive to a surface of skin, and
- (b) at least one sheet of stretchable porous material bonded to and supporting said membrane to urge said membrane into conformance with body surfaces.

2. The improvement substantially as recited in claim 1 wherein a sheet of porous material is bonded to each side of the membrane.

3. The improvement substantially as recited in claim 1 wherein one sheet of porous material is used and the adhesive is disposed on the membrane-side of the bandage.

4. The improvement substantially as recited in claim 1 wherein one sheet of porous material is used and the adhesive is disposed on the porous material-side of the bandage.

5. The improvement substantially as recited in claim 1 wherein the membrane has a uniform thickness in the range of 1 to 10 mils to permit controlled fluid passage from the wound through the bandage and also permit selected fluids to pass to the wound area to promote the healing process, the passage of the fluids being due to a difference in partial pressures thereof across said membrane.

6. The improvement substantially as recited in claim 1 wherein the membrane is a silicone rubber material.

7. A method of fabricating surgical bandages through which selected gases and vapors pass due to a difference in partial pressures thereof across a permselective membrane comprising the steps of
- priming a sheet of nontoxic stretchable porous material with a silicone rubber solution dissolved in isopropyl alcohol,
- pressing the primed sheet of porous material together with a sheet of thin imperforate silicone rubber membrane selectively permeable to specific gases and vapors to form a backed membrane,
- heating the backed membrane at 150° C. for one-half hour to cure the backed membrane and obtain a permanent bond of the porous material to the membrane,
- applying an adhesive to selected portions of one side of the backed membrane, and
- cutting the sheet of backed membrane along predetermined lines to form a plurality of surgical bandages wherein the adhesive is disposed along all edges of one side of each bandage.

References Cited

UNITED STATES PATENTS

| | | | |
|---|---|---|---|
| 3,006,338 | 10/1961 | Davies | 128—156 |
| 3,118,534 | 1/1964 | Groff et al. | |
| 3,174,889 | 3/1965 | Anderson et al. | |
| 3,255,749 | 6/1966 | Smithers | 128—156 |
| 3,288,139 | 11/1966 | Goodman | 128—156 |

ADELE M. EAGER, *Primary Examiner.*